US008086896B2

(12) United States Patent
Allen et al.

(10) Patent No.: US 8,086,896 B2

(45) Date of Patent: Dec. 27, 2011

(54) DYNAMICALLY TRACKING VIRTUAL LOGICAL STORAGE UNITS

(75) Inventors: James P. Allen, Austin, TX (US); Kiran K. Anumalasetty, Marathalli (IN); Sudhir Maddali, Kukatpally (IN); Bhyrav M. Mutnury, Austin, TX (US); James A. Pafumi, Leander, TX (US); Sanket Rathi, Kondapur (IN); Stephen M. Tee, Marble Falls, TX (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 12/647,664

(22) Filed: Dec. 28, 2009

(65) Prior Publication Data

US 2011/0161725 A1 Jun. 30, 2011

(51) Int. Cl.
*G06F 11/00* (2006.01)

(52) U.S. Cl. ........................ 714/5.11; 711/154; 709/224

(58) Field of Classification Search ........................ 714/5
See application file for complete search history.

(56) References Cited

U.S. PATENT DOCUMENTS

| | | | | |
|---|---|---|---|---|
| 5,790,775 | A | 8/1998 | Marks et al. | |
| 6,393,535 | B1 * | 5/2002 | Burton et al. | 711/158 |
| 6,601,128 | B1 * | 7/2003 | Burton et al. | 710/316 |
| 6,854,035 | B2 * | 2/2005 | Dunham et al. | 711/117 |
| 7,076,688 | B2 | 7/2006 | Yamamoto | |
| 7,171,522 | B2 * | 1/2007 | Watanabe et al. | 711/144 |
| 7,228,380 | B2 * | 6/2007 | Yamamoto et al. | 711/113 |
| 7,383,330 | B2 * | 6/2008 | Moran et al. | 709/223 |
| 7,418,633 | B1 | 8/2008 | Salpekar et al. | |
| 7,457,899 | B2 * | 11/2008 | Ohno et al. | 710/74 |
| 7,464,223 | B2 * | 12/2008 | Watanabe et al. | 711/114 |
| 7,711,896 | B2 * | 5/2010 | Yamamoto et al. | 711/113 |
| 2003/0221001 | A1 * | 11/2003 | Moran et al. | 709/224 |
| 2004/0257857 | A1 * | 12/2004 | Yamamoto et al. | 365/154 |
| 2005/0114477 | A1 * | 5/2005 | Willging et al. | 709/220 |
| 2005/0216692 | A1 * | 9/2005 | Watanabe et al. | 711/170 |

(Continued)

FOREIGN PATENT DOCUMENTS

EP 1575236 9/2005

OTHER PUBLICATIONS

B., Mike,"VCB & ESX LUN Configuration Problem", http://communities.vmware.com/thread/80983 Apr. 18, 2007, 5 pages.
Duncan, "Cannot Re-add Existing LUN", http://communities.vmware.com/thread/121420 Jan. 15, 2008.

(Continued)

*Primary Examiner* — Joshua Lohn
*Assistant Examiner* — Kamini Patel
(74) *Attorney, Agent, or Firm* — DeLizio Gilliam, PLLC

(57) ABSTRACT

In virtualized environments, storage may be managed dynamically due to the changing data storage requirements. In such environments, logical storage unit identifiers (LUN IDs) may be modified as a result of deleting an existing mapping between physical storage and a virtualization server and recreating the mapping. This can result in I/O request failure. Techniques for resolving errors resulting from LUN ID modifications can be time-intensive and labor-intensive and can disrupt a communication path between a host device and the physical storage. Functionality can be implemented to dynamically identify the LUN ID modifications, determine valid LUN IDs, and retransmit failed I/O requests. This can help minimize I/O request failures due to LUN ID modifications without disrupting the communication path between the host device and the physical storage.

20 Claims, 4 Drawing Sheets

U.S. PATENT DOCUMENTS

| | | | | |
|---|---|---|---|---|
| 2007/0118694 | A1* | 5/2007 | Watanabe et al. | 711/118 |
| 2007/0168598 | A1* | 7/2007 | Yamamoto et al. | 711/100 |
| 2008/0091933 | A1* | 4/2008 | Marks et al. | 713/2 |
| 2008/0222381 | A1* | 9/2008 | Lam | 711/170 |
| 2009/0106766 | A1* | 4/2009 | Masuda | 718/104 |

OTHER PUBLICATIONS

Slowe, "How to Provision VMs Using NetApp FlexClones", http://benwaynet.wordpress.com/category/vmware/ May 11, 2007, 11 pages.

* cited by examiner

DYNAMICALLY TRACKING VIRTUAL LOGICAL STORAGE UNITS

BACKGROUND

Embodiments of the inventive subject matter generally relate to the field of data storage and, more particularly, to dynamic tracking of virtual logical storage units.

Storage virtualization is achieved by abstracting physical storage locations (e.g., hard disks, etc.). Virtualization software maps the physical storage to a logical storage space represented by virtual logical storage units. The virtual logical storage units are identified by logical storage unit identifiers.

SUMMARY

Embodiments include a method comprising requesting, in response to a notification indicating that a request to access a destination logical storage unit identified by a destination logical storage unit identifier cannot be served, a current list of logical storage unit identifiers and serial identification numbers associated therewith. A first serial identification number associated with the destination logical storage unit identifier is determined. It is determined that a first of the serial identification numbers of the current list matches the first serial identification number associated with the destination logical storage unit identifier. The destination logical storage unit is identified by a first of the logical storage unit identifiers of the current list that is associated with the first of the serial identification numbers.

Another embodiment includes a method comprising transmitting a request to access a destination logical storage unit identified by a destination logical storage unit identifier. A notification indicating that the request to access the destination logical storage unit identified by the destination logical storage unit identifier cannot be served is received. A current list of logical storage unit identifiers and serial identification numbers associated therewith is requested in response to receiving the notification. A first serial identification number associated with the destination logical storage unit identifier is determined. It is determined that a first of the serial identification numbers of the current list matches the first serial identification number associated with the destination logical storage unit identifier. The destination logical storage unit is identified by a first of the logical storage unit identifiers of the current list that is associated with the first of the serial identification numbers. A second request to access the destination logical storage unit is generated based, at least in part, on the request. The second request identifies the destination logical storage unit by the first of the logical storage unit identifiers. The second request is retransmitted.

Another embodiment includes a computer program product for dynamically tracking virtual logical storage units, where the computer program product comprises a computer readable medium comprising computer readable program code. The computer readable program code is configured to request, in response to a notification indicating that a request to access a destination logical storage unit identified by a destination logical storage unit identifier cannot be served, a current list of logical storage unit identifiers and serial identification numbers associated therewith. The computer readable program code is configured to determine a first serial identification number associated with the destination logical storage unit identifier. The computer readable program code is also configured to determine that a first of the serial identification numbers of the current list matches the first serial identification number associated with the destination logical storage unit identifier. The computer readable program code is further configured to identify the destination logical storage unit by a first of the logical storage unit identifiers of the current list that is associated with the first of the serial identification numbers.

Another embodiment includes an apparatus comprising a processor, a network interface coupled with the processor, and a logical unit identification unit. The logical unit identification unit is operable to request, in response to a notification indicating that a request to access a destination logical storage unit identified by a destination logical storage unit identifier cannot be served, a current list of logical storage unit identifiers and serial identification numbers associated therewith. The logical unit identification unit is operable to determine a first serial identification number associated with the destination logical storage unit identifier. The logical unit identification unit is operable to determine that a first of the serial identification numbers of the current list matches the first serial identification number associated with the destination logical storage unit identifier. The logical unit identification unit is further operable to identify the destination logical storage unit by a first of the logical storage unit identifiers of the current list that is associated with the first of the serial identification numbers.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples describe using logical unit identifiers (LUN IDs) to identify logical storage units, any suitable identifier (e.g., a serial identification number, device identifier of a physical storage device that corresponds to the logical storage unit) may be used to identify the logical storage units. In other instances, well-known instruction instances, protocols, structures, and techniques have not been shown in detail in order not to obfuscate the description.

In environments where storage is managed dynamically due to the changing data storage requirements of a user (e.g., virtualized environments), dynamic management of the storage can result in changes in logical storage unit addresses (also known as logical unit identifiers or LUN IDs). A change in a LUN ID can affect the ability of a host device to access a logical storage unit associated with the LUN ID. For example, a Virtual I/O Server (VIOS) may export physical hard disks as virtual logical storage units with specific LUN IDs. The LUN ID may be modified. For instance, an administrator removes a mapping between the hard disk and the VIOS and recreates the mapping, resulting in an I/O request failure. Typically, such errors resulting from a change in LUN IDs may be resolved by a time and labor-intensive process involving removing erroneous device instances, deleting old mapping relationships, reconfiguring the host device to search for new logical storage units and identify new mapping relationships and LUN IDs, etc.

Functionality can be implemented to track dynamic changes of the LUN IDs, determine (if possible) new LUN IDs associated with the logical storage units, and retransmit failed I/O requests with minimal disruption. A logical unit identification unit can identify a serial identification number associated with a destination logical storage unit and compare the serial identification number against a list of serial identification numbers of available logical storage units. A new LUN ID associated with the logical storage unit can be identified based on detecting a match between the serial identification number associated with the destination logical storage unit and a serial identification number associated with the new LUN ID. Automating the process of identifying invalid LUN IDs and identifying (if possible) new/valid LUN IDs can ensure that I/O failure because of dynamic LUN ID changes are mitigated without breaking a communication path between the host device and the storage.

Figure 1:
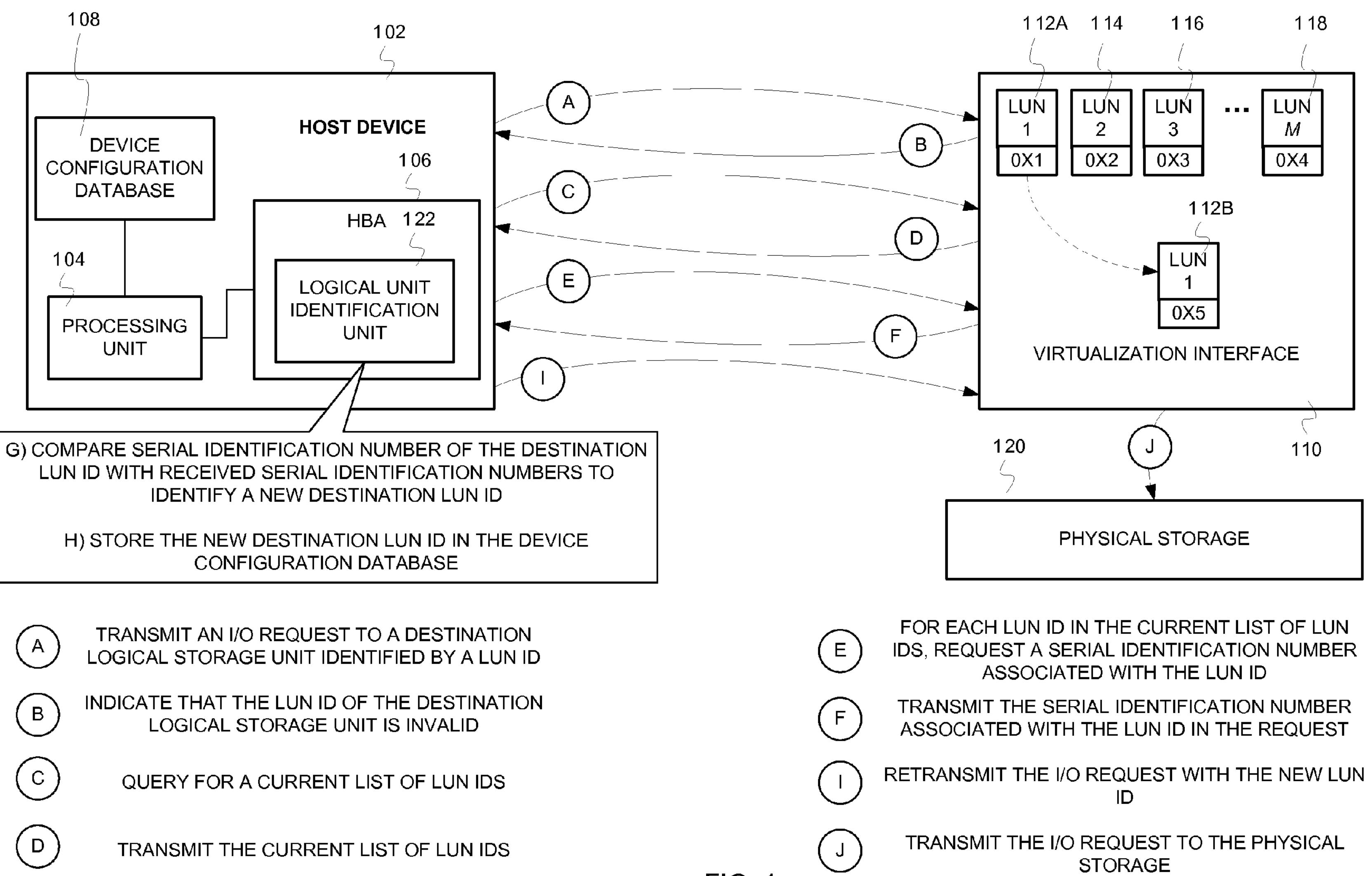
FIG. 1 is an example conceptual diagram illustrating dynamic tracking of virtual logical storage units.

FIG. 1 is an example conceptual diagram illustrating dynamic tracking of virtual logical storage units. FIG. 1 depicts a host device 102 in communication with physical storage system 120. The host device 102 may be a personal computer, a laptop, or other electronic device configured to access the physical storage system 120. The host device 102 accesses the physical storage system 120 via a virtualization interface 110. The host device 102 comprises a processing unit 104, a device configuration database 108, and a host bus adapter (HBA) 106. The processing unit 104 communicates with the HBA 106 and the device configuration database 108. The HBA 106 comprises a logical unit identification unit 122.

The virtualization interface 110 acts an interface between the host device 102 and the physical storage system 120. The virtualization interface 110 maps a physical storage space comprising the physical storage system 120 to a logical storage space comprising logical storage units or logical hard drives. In one implementation, the virtualization interface 110 can be a virtual I/O server. The physical storage system 120 can comprise a combination of one or more hard disks, tape drives, magnetic storage units, and other such external storage devices. The virtualization interface 110 can comprise a mapping table that comprises a mapping or relationship between a logical storage unit and a corresponding segment of the physical storage system 120.

A logical storage unit typically corresponds to a segment of the physical storage system 120. The segment of the physical storage system can be the hard disk, the tape drive, or the other electronic storage units. The segment of the physical storage system may also be a partition of a storage volume. For example, the storage volume may be partitioned into a set of partitions and each partition of the set of partitions may correspond to a logical storage unit with a distinct logical storage unit identifier (LUN ID) and a distinct serial identification number. In some implementations, the logical storage units may have consecutive LUN IDs but may not correspond to contiguous memory partitions. Also, each of the segments of physical storage system 120 need not be physically connected to each other. With reference to FIG. 1, the physical storage system 120 comprises M segments, each of which correspond to M logical storage units depicted in the virtualization interface 110. Logical storage unit 112A is assigned a LUN ID 0x1, logical storage unit 114 is assigned a LUN ID 0x2, and logical storage unit 116 is assigned a LUN ID 0x3. The $M^{th}$ logical storage unit 118 is assigned a LUN ID 0x4. The LUN ID of the logical storage unit 112A is changed from 0x1 to 0x5 as represented by a dashed line connecting the logical storage unit 112A and a logical storage unit 112B. The logical storage unit 112B represents a transformed logical storage unit generated as a result of changing the LUN ID from 0x1 to 0x5.

In one implementation, the LUN ID can identify a device on a Small Computer System Interface (SCSI) bus. In another implementation, the LUN ID can identify a FibreChannel device, an Internet SCSI (iSCSI) device, or any other storage devices connected to the host device 102 via suitable storage networking protocols (e.g., HyperSCSI, SATA, etc.). In a SCSI environment, the HBA 104 may be a SCSI initiator that transmits a SCSI command, while the virtualization interface 110 may receive the SCSI commands, provide requests to the physical storage system 120, and provide responses to the requests to the HBA unit 106.

The logical unit identification unit 122 implements functionality to dynamically determine invalid LUN IDs associated with logical storage units and to identify new LUN IDs associated with the logical storage units, as described below.

At stage A, the host device 102 transmits an input/output (I/O) request to a destination logical storage unit that is identified by a LUN ID. For example, the host device 102 may transmit the I/O request to the logical storage unit 112A that is identified by the LUN ID 0x1. In one implementation, the processing unit 104 may generate the I/O request, indicate a LUN ID of the destination logical storage unit, and direct the HBA 106 to transmit the I/O request. The processor 104 may access the device configuration database 108 to identify the LUN ID associated with the destination logical storage unit. The I/O request can comprise a request to access, modify, or write data on a segment of the physical storage system 120 that corresponds to the destination logical storage unit.

At stage B, the host device 102 receives an error notification indicating that the LUN ID of the destination logical storage unit is invalid. The error notification may also indicate the I/O request could not be serviced because the destination logical storage unit associated with the LUN ID specified in the I/O request could not be located. The virtualization interface 110 may receive the I/O request, read the LUN ID, determine that the destination logical storage unit corresponding to the LUN ID cannot be determined, and generate the error notification. For example, the virtualization interface 110 may read the LUN ID 0x1 in the I/O request, determine that the LUN ID 0x1 does not exist, and generate the error notification. In some implementations, the LUN ID associated with the destination logical storage unit may be modified either dynamically through a virtualization interface (e.g., a virtual I/O server), storage manager (e.g., a DS4K, Storage Area Networking Volume Controller (SVC), etc.), etc., or by an administrator. For example, the virtual I/O server may delete an old mapping between the destination logical storage unit and the corresponding segment of the physical storage system and create a new mapping. This can result in a change in the LUN ID of the destination logical storage unit which, in turn, results in the invalid LUN ID error notification. In a SCSI implementation, a check may be performed on receiving the I/O request and a response indicating a SCSI check condition or an error may be transmitted to the host device 102. The HBA 106 in the host device 102 may receive the error notification and direct the logical unit identification unit 122 to identify (if possible) a current LUN ID for the destination logical storage unit. On receiving the error notification, the logical unit identification unit 122 may also store (or direct the processing unit 104 to store) the I/O request that resulted in the error notification ("failed I/O request")

At stage C, the logical unit identification unit 122 transmits a query for a current list of LUN IDs. In one implementation, the logical unit identification unit 122 directs the query to a SCSI target port. The virtualization interface 110 may receive the query for the current list of LUN IDs. In one implementation, the logical unit identification unit 122 may transmit a "REPORT LUNS" command to the virtualization interface 110. In another implementation, the logical unit identification unit 122 may transmit any suitable command, depending on the storage networking protocols being implemented, requesting the current list of LUN IDs.

At stage D, the virtualization interface 110 determines and transmits the current list of LUN IDs to the logical unit identification unit 122. In one implementation, the virtualization interface 110 may transmit a file or a message comprising the current list of LUN IDs. In this illustration, the current list of LUN IDs includes 0x2, 0x3, 0x4, 0x5, etc. The current list of LUN IDs does not indicate the LUN ID 0x1 because the LUN ID 0x1 no longer exists (i.e., was changed to 0x5).

At stage E, the logical unit identification unit 122 requests a serial identification number for each LUN ID in the current list of LUN IDs. The logical unit identification unit 122 may transmit an "INQUIRY" command or any suitable vendor-specific command to the virtualization interface 110 specifying one of the LUN IDs retrieved from the current list of LUN IDs. In one implementation, the logical unit identification unit 122 may transmit a separate INQUIRY command to receive a serial identification number for each LUN ID in the current list of LUN IDs ("received serial identification numbers"). For example, the logical unit identification unit 122 may transmit a first INQUIRY command specifying LUN ID 0x2 and receive a serial identification number associated with the LUN ID 0x2. The logical unit identification unit 122 may then transmit a second INQUIRY command specifying LUN ID 0x3 and receive a serial identification number associated with the LUN ID 0x3, and so on. In another implementation, the logical unit identification unit 122 may transmit a single command and receive the current list of LUN IDs and a corresponding serial identification number for each LUN ID in the current list of LUN IDs.

At stage F, the virtualization interface 110 transmits the serial number associated with the LUN ID. The virtualization interface 110 may access a table (e.g., a mapping table) comprising the current list of LUN IDs and their associated serial identification numbers. The virtualization interface 110 can transmit a response to the INQUIRY command or other suitable command indicating a serial identification number associated with a logical storage unit referenced by the LUN ID.

At stage G, the logical unit identification unit 122 compares a serial identification number associated with the invalid LUN ID of the destination logical storage unit against each of the received serial identification numbers. The logical unit identification unit 122 may determine the serial identification number associated with the invalid LUN ID from the device configuration database 108. The device configuration database 108 can comprise a list of logical storage unit LUN IDs and a corresponding serial identification number associated with each of the LUN IDs. In some implementations, the device configuration database 108 may be embodied as part of an operating system on the host device 102 and may be implemented as a structure, a list, etc. In other implementations, the device configuration database 108 may be embodied on a distinct computer system. At stage G, the logical unit identification unit 122 also determines whether the serial identification number associated with the invalid LUN ID is identical to one of the received serial identification numbers. In some implementations, the logical unit identification unit 122 may successively compare the serial identification number associated with the invalid LUN ID against each of the received serial identification numbers. In other implementations, the logical unit identification unit 122 may determine a hash value (or other suitable representation obtained as a result of algorithms or mathematical functions) of the serial identification number associated with the invalid LUN ID and hash values (or other suitable representations) of each of the received serial identification numbers. The logical unit identification unit 122 may compare the hash values to determine whether there exists a match between the serial identification number associated with the invalid LUN ID and one of the received serial identification numbers. At stage G, the logical unit identification unit 122 detects a match and determines a LUN ID associated with a serial identification number that matches the serial identification number of the invalid LUN ID. The logical unit identification unit 122 designates the determined LUN ID as a new LUN ID of the destination logical storage unit. In FIG. 1, the logical unit identification unit 122 determines that the received serial identification number associated with the LUN ID 0x5 matches the serial identification number of the invalid LUN ID 0x1. The logical unit identification unit 122 designates the LUN ID 0x5 as the new LUN ID of the destination logical storage unit.

At stage H, the logical unit identification unit 122 directs the processing unit to store the new LUN ID of the destination logical storage unit in the device configuration database 108. The logical unit identification unit 122 may notify the processing unit 104 regarding the new LUN ID of the destination logical storage unit and the processing unit 104 may accordingly update the device configuration database 108. The invalid LUN ID associated with the destination logical storage unit may be overwritten with the new LUN ID. The new LUN ID may be linked to the serial identification number of the destination logical storage unit so that the new LUN ID references the destination logical storage unit. For example, the LUN ID 0x1 may be overwritten with the LUN ID 0x5. In some implementations, the logical unit identification unit 122 may perform operations for deleting indications of the invalid LUN ID and associating the new LUN ID with the serial identification number of the destination logical storage unit.

At stage I, the HBA 106 retransmits the failed I/O request using the new LUN ID of the destination logical storage unit. In one implementation, the logical unit identification unit 122 may notify the processing unit 104 of the new LUN ID of the destination logical storage unit. The processing unit 104 may retrieve, from a failed I/O queue, an indication of the failed I/O request directed to the destination logical storage unit and may modify the I/O request so that the I/O request indicates the new LUN ID (i.e., the LUN ID 0x5) of the destination logical storage unit. Embodiments can also create a new request using the new LUN ID instead of modifying the failed request. Embodiments can also track failed requests without storing entire requests. Embodiments can maintain a structure with information about failed requests (e.g., data to be stored, invalid LUN ID, time of request, etc.).

At stage J, the virtualization interface 110 receives a retransmitted I/O request from the HBA 106 and transmits the I/O request to the physical storage system 120. On receiving the retransmitted I/O request, the virtualization interface 110 may translate the new LUN ID, specified in the retransmitted I/O request, into a memory location on the physical storage system 120. The virtualization interface 110 may transmit a message comprising the memory location on the physical storage system 120 and commands indicating operations to be performed (e.g., read operations, write operations, etc). On receiving a response to the message (e.g., accessed data, a status message, etc.) the virtualization interface 110 can communicate the response to the host device 102

However, the logical unit identification unit 122 may not always be able to identify a match for the serial identification number associated with the invalid LUN ID. The logical unit identification unit 122 can determine an inability to identify a match between the serial identification number associated with the invalid LUN ID and one of the received serial identification numbers. Based on the inability to identify a match for the serial identification number associated with the invalid LUN ID, the logical unit identification unit 122 can determine that a segment of physical memory associated with the destination logical storage unit has been revoked. For example, a hard disk referenced by the destination logical storage unit may be removed, resulting in the inability to identify a match for the serial identification number associated with the invalid LUN ID. The logical unit identification unit 122 communicates the inability to identify a match between the serial identification number associated with the invalid LUN ID and one of the received serial identification numbers to the processing unit 104. The processing unit 104 can modify the device configuration database 106 to remove indications (e.g., the invalid LUN ID and the corresponding serial identification number) of the destination logical storage unit. The processing unit 104 can also remove the failed I/O request directed to the destination logical storage unit from the failed I/O queue. In some implementations, the processing unit 104 may transmit a notification for presentation, to a user, on a display device indicating failure of the I/O request. The processing unit 104 may present details of the failed I/O request in the notification and/or may store the details in an event log. It should be noted that in some implementations, the logical unit identification unit 122 might modify the device configuration database 108 to remove the indications of the destination logical storage unit.

Figure 2:
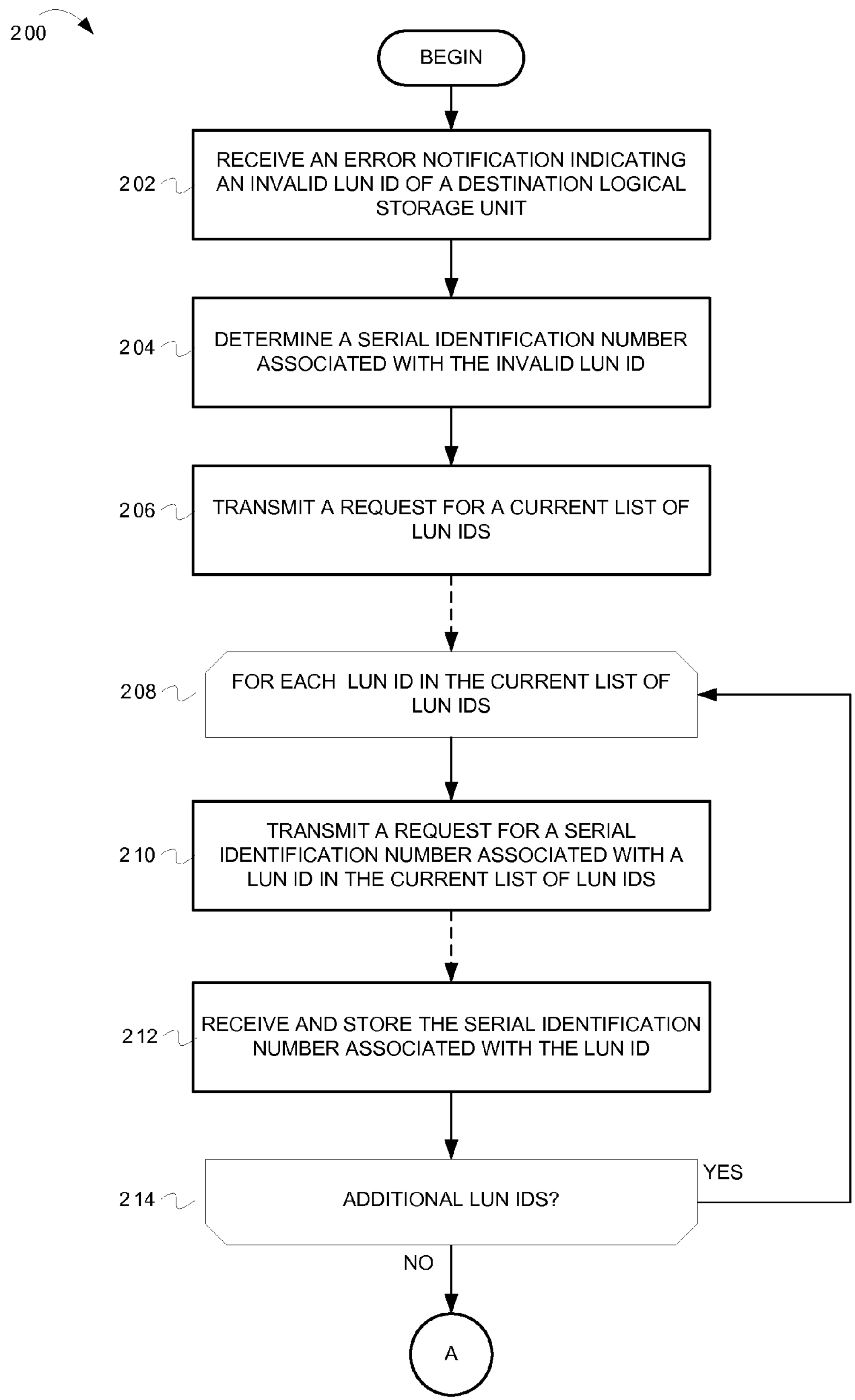
FIG. 2 is an example conceptual diagram illustrating operations for dynamically tracking modifications in virtual storage unit addresses.
Figure 3:
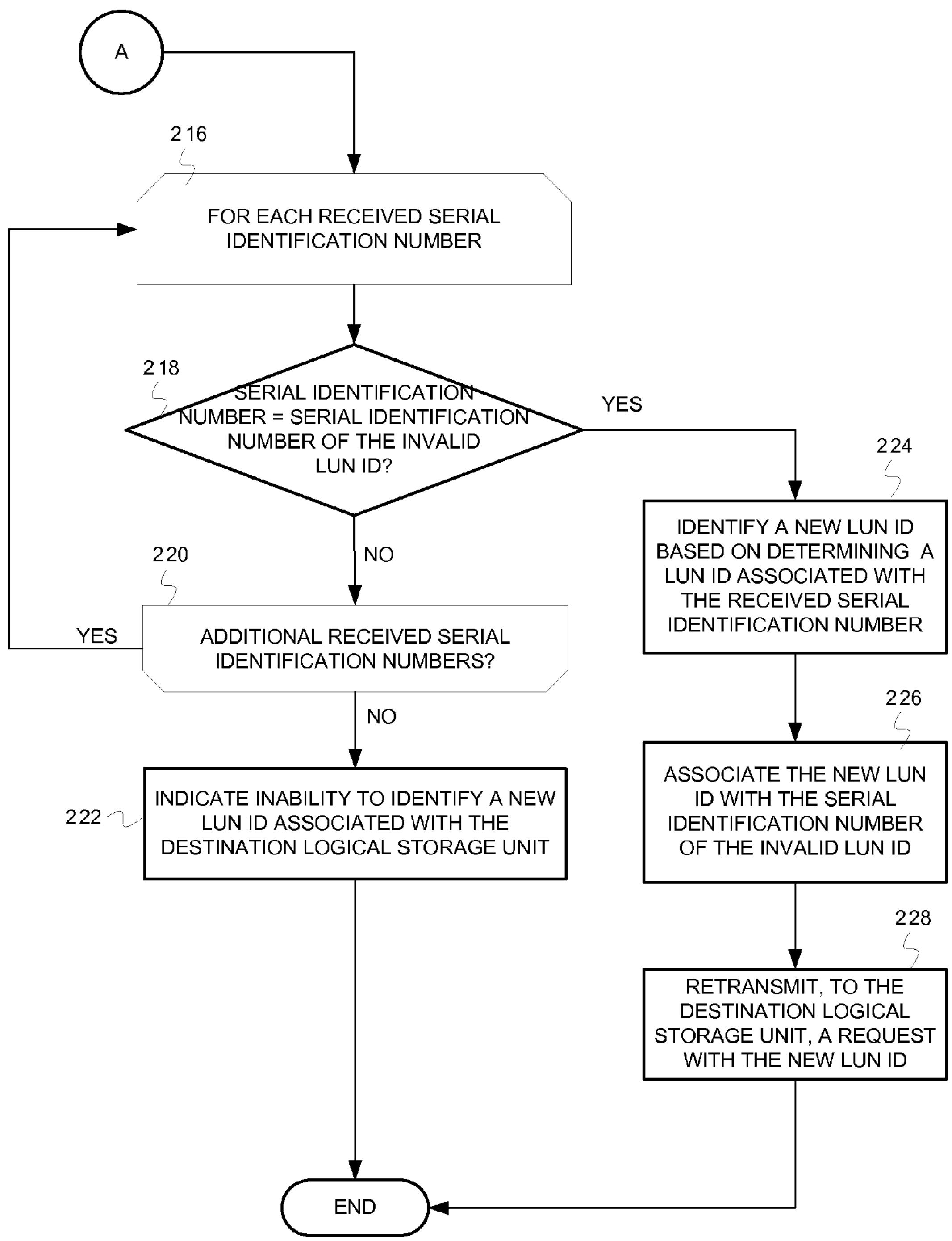
FIG. 3 is an example conceptual diagram illustrating operations for dynamically tracking modifications in virtual storage unit addresses.

FIGS. 2 and 3 depict an example conceptual diagram illustrating operations for dynamically tracking modifications in virtual storage unit addresses. Flow 200 begins at block 202 in FIG. 2.

An error notification indicating an invalid LUN ID of a destination logical storage unit is received (block 202). The error notification may be received in response to a host device transmitting an I/O request (e.g., a request for accessing and operating on a physical storage system). The I/O request indicates a LUN ID that references the destination logical storage unit and consequently the physical storage system or a part of the physical storage system (e.g., a hard disk, a memory partition, etc.) to be accessed for servicing the I/O request. In one implementation, the error notification may be generated if the LUN ID associated with the destination logical storage unit is modified, e.g., when an administrator removes a mapping between the hard disk and a virtualization unit and creates a new mapping. The I/O request may be received (e.g., by the virtualization unit) from the host, the LUN ID of the destination logical storage unit may be read from the I/O request, and it may be determined that the LUN ID indicated in the I/O request does not exist. The error notification may be generated to indicate that the I/O request could not be serviced because the destination logical storage unit associated with the LUN ID specified in the I/O request could not be located. The flow continues at block 204.

A serial identification number associated with the invalid LUN ID of the destination logical storage unit is determined (block 204). When a network comprising the host device, the physical storage system, the virtualization unit, and other components (e.g., other host devices) is initialized, a serial identification number may be assigned (e.g., by the virtualization unit) to each segment of the physical storage system. The segment of the physical storage system can comprise individual hard disks, tape drives, magnetic disks, and other such storage units. The segment of the physical storage system can also comprise memory blocks partitioned from a single memory module. For example, the memory module may be partitioned into five memory blocks. Each of the five memory blocks may be assigned a unique serial identification number and each of the five memory blocks may be referenced by a unique LUN ID. The list of LUN IDs and serial identification number associated with each of the LUN IDs may be transmitted to the host. The host can store the list of LUN IDs and corresponding serial identification numbers as part of device configuration information. On receiving the error notification, the device configuration information can be accessed and the serial identification number associated with the invalid LUN ID can be determined. The flow continues at block 206.

A request for a current list of LUN IDs is transmitted (block 206). The request for the current list of LUN IDs may be transmitted in a "REPORT LUNS" command or any suitable command depending on the implementation of storage networking protocols. The current list of LUN IDs represents a most recent list of LUN IDs that reference the segments of the physical storage system. The current list of LUN IDs may vary from a past list of LUN IDs if a mapping between one of the segments of the physical storage system and the virtualization unit is modified or removed, if one of the segments of the physical storage system is removed, if a new segment of the physical storage system is added, etc. In response to the request, the host can receive a file or message comprising the current list of LUN IDs. The flow continues at block 208 after the current list of LUN IDs is received (as depicted by the dashed line connecting blocks 206 and 208).

A loop begins for a set of operations (described in blocks 210 and 212) on each of the LUN IDs in the current list of LUN IDs (block 208). At block 208, it is also determined whether there exists another LUN ID in the current list of LUN IDs for which a serial identification number associated with the LUN ID should be requested. A next LUN ID in the current list of LUN IDs is identified and the loop executes for the next LUN ID. For each LUN ID in the current list of LUN IDs, the flow continues at block 210.

A request for a serial identification number associated with a LUN ID in the current list of LUN IDs is transmitted (block 210). An "INQUIRY" command or any suitable vendor specific commands may be transmitted to request the serial identification number associated with the LUN ID. The request for the serial identification number also indicates the LUN ID. The flow continues at block 212.

The serial identification number associated with the LUN ID is received and stored (block 212). The serial identification number associated with the LUN ID may be determined (e.g., by the virtualization unit) by accessing a table, database, structure, etc., comprising a mapping of the current list of LUN IDs and corresponding serial identification numbers. The flow continues at block 214.

The loop for each of the LUN IDs in the current list of LUN IDs ends (block 214). If there are additional LUN IDs in the current list of LUN IDs, then control flows back to block 208, where the next LUN ID is identified and the operations described with reference to block 210 and 212 are performed for the next LUN ID. The loop ends when it is determined that the loop operations (block 210 and block 212) have been performed for every LUN ID in the current list of LUN IDs. After the loop ends, the flow continues at block 216 in FIG. 3.

A second loop begins for a set of operations (described in block 218) on each of the serial identification numbers received as a result of operations described with reference to blocks 210 and 212 ("received serial identification number") (block 216). At block 216, it is also determined whether there exists another received serial identification number that should be compared with the serial identification number associated with the invalid LUN ID. A next received serial identification number is identified and the loop executes for the next received serial identification number. For each received serial identification number, the flow continues at block 218.

It is determined whether the serial identification number associated with the invalid LUN ID equals the received serial identification number (block 218). In one implementation, actual values of the serial identification numbers may be compared. In other implementations, a hash value or other suitable representation of the serial identification number associated with the invalid LUN ID may be calculated and compared against a corresponding representation of the received serial identification number. If it is determined that the serial identification number of the invalid LUN ID equals the received serial identification number, the flow continues at block 224. Otherwise, the flow continues at block 220. It should be noted that control exits the second loop beginning at block 216 if a match for the serial identification number associated with the invalid LUN ID is identified.

A new LUN ID is identified based on determining a LUN ID associated with the received serial identification number that matches the serial identification number associated with the invalid LUN ID (block 224). The flow continues at block 226.

The new LUN ID is associated with the serial identification number of the invalid LUN ID (block 226). The invalid LUN ID previously associated with the destination logical storage unit may be overwritten with the new LUN ID. The host device may link the new LUN ID to the serial identification number of the destination logical storage unit. The device configuration information may also be updated to reflect a change in the LUN ID of the destination logical storage unit. The flow continues at block 228.

A request comprising the new LUN ID is transmitted to the destination logical storage unit (block 228). In one implementation, the request may be a modified version of a failed I/O request targeted to the destination logical storage unit. The failed I/O request may be retrieved (e.g., from a failed I/O queue), modified (e.g., to indicate the new LUN ID, new timestamps, etc.), and retransmitted. Alternately, a new request may be created, using the new LUN ID, and transmitted to the destination logical storage unit. From block 228, the flow ends.

The second loop for each of the received serial identification numbers ends (block 220). The flow 200 moves from block 218 to block 220 on determining that the serial identification number associated with the invalid LUN ID does not match the received serial identification number. If there are additional received serial identification numbers, then control flows back to block 216, where the next received serial identification number is identified and the operations described with reference to block 218 are performed for the next received serial identification number. The loop ends when it is determined that the loop operations (block 218) have been performed for every received serial identification number. After the loop ends, the flow continues at block 222.

An inability to identify the new LUN ID associated with the destination logical storage unit is indicated (block 222). The new LUN ID associated with the destination logical storage unit may not be determined if a match between the serial identification number associated with the invalid LUN ID and one of the received serial identification numbers cannot be identified. Such a situation can arise if physical memory associated with the destination logical storage unit has been revoked (e.g., a hard disk referenced by the destination logical storage unit is removed). On determining that the new LUN ID for the destination logical storage unit cannot be determined, information associated with the destination logical storage unit (e.g., the serial identification number, the invalid LUN ID, etc.) may be removed from the device configuration information. I/O requests targeted to the destination logical storage unit may also be removed (e.g., from a failed I/O queue, from a processing queue, etc.). A notification indicating failed I/O requests may be stored in an event log and/or may be presented to a user. From block 222, the flow ends.

It should be noted that the operations described in the flow diagrams are examples meant to aid in understanding embodiments, and should not be used to limit embodiments or limit scope of the claims. Embodiments may perform additional operations, fewer operations, operations in a different order, operations in parallel, and some operations differently. For example, blocks 210-212 in FIG. 2 indicate that a separate request is transmitted to receive a serial identification number for each LUN ID in the current list of LUN IDs. However, in some implementations, the host device may not transmit individual requests for each LUN ID. Instead, a single command or a single request comprising multiple commands may be transmitted to receive the current list of LUN IDs and the serial identification number associated with each LUN ID in the current list of LUN IDs.

In some implementations, the serial identification number of the invalid LUN ID may be compared with the received serial identification number on receiving the serial identification number. Operations for comparing the serial identification numbers, as described with reference to block 218, may be performed within the loop beginning at block 208 and after operations described by block 212. The loop beginning at block 208 may repeat until a match for the serial identification number associated with the invalid LUN ID is identified or until all the received serial identification numbers have been compared against the serial identification number associated with the invalid LUN ID. Control may exit the loop on detecting a match between the serial identification number associated with the invalid LUN ID and the received serial identification number. The operations of requesting a next received serial identification number and comparing the received serial identification number with the serial identification number associated with the invalid LUN ID may be stopped once a match for the serial identification number associated with the invalid LUN ID is determined.

In some implementations, the received serial identification numbers may be compared with serial identification numbers of other logical storage units indicated in the device configuration information. On detecting a match between the serial identification numbers, the host may compare LUN IDs associated with the matched serial identification numbers. If there is a match between the LUN IDs, the host may determine that the LUN ID of the logical storage unit associated with the serial identification number has not been changed. However, if the LUN IDs do not match, the host may replace a past LUN ID with a current LUN ID as described with reference to blocks 224-226. In some implementations, on identifying a new LUN ID associated with a logical storage unit, the host device may communicate the new LUN ID to other host devices connected to the communication network and accessing the physical storage system.

Lastly, it should also be noted that although the examples describe using LUN IDs to identify logical storage units, any suitable identifier might be used to identify the logical storage units. In one implementation, the serial identification number or device identifier may be used to identify the logical storage unit. The serial identification number or device identifier may be a unique identifier of a physical storage system device that corresponds to the logical storage unit. Alternately, system or user-defined serial identification numbers may be used to identify the logical storage unit.

Figure 4:
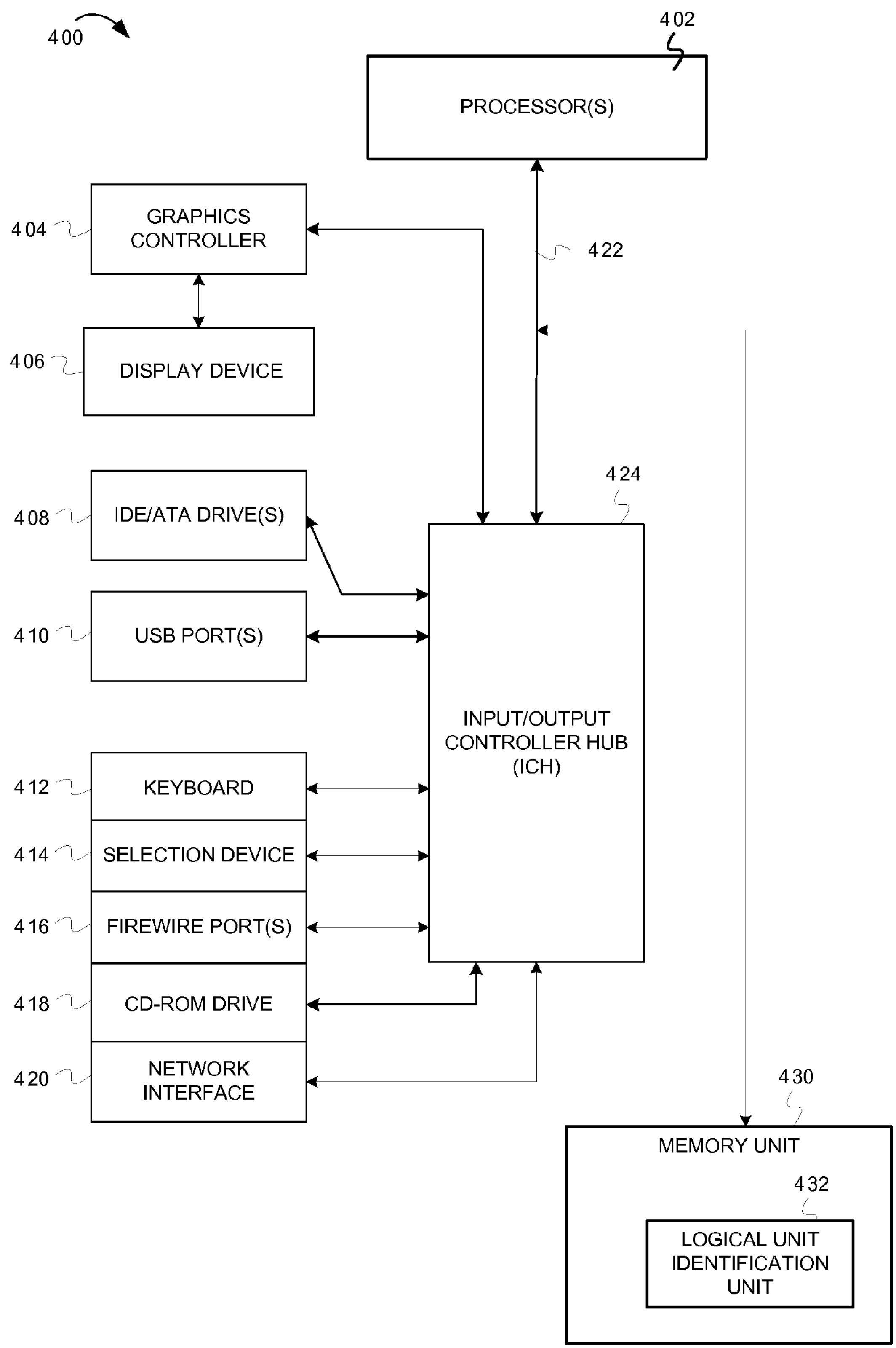
FIG. 4 is an example computer system configured for dynamic tracking of virtual storage unit addresses.

FIG. 4 is an example computer system configured for dynamic tracking of virtual logical storage unit addresses. The computer system 400 includes a processor 402. The processor 402 is connected to an input/output controller hub 424 (ICH), also known as a south bridge, via a bus 422 (e.g., PCI, ISA, PCI-Express, HyperTransport, etc). A memory unit 430 interfaces with the processor 402 and the ICH 424. The main memory unit 430 can include any suitable random access memory (RAM), such as static RAM, dynamic RAM, synchronous dynamic RAM, extended data output RAM, etc The memory unit 430 comprises a logical unit identification unit 432. The logical unit identification unit 432 implements functionality to dynamically track modifications made to logical storage unit addresses. The logical storage unit addresses or LUN IDs may be modified by a change in mapping between physical memory and a virtualization interface. On receiving an error notification indicating a failed I/O request, the logical unit identification unit 432 can request and receive a current list of LUN IDs and a serial identification number associated with each LUN ID in the current list of LUN IDs. The logical unit identification unit 432 can compare received serial identification numbers with a serial identification number of a destination logical storage unit and determine (if possible) a new LUN ID that corresponds to the serial identification number of the destination logical storage unit. The new LUN ID may be stored on the host 400 for future reference. In one implementation, the logical unit identification unit 432 may be embodied within a host bus adapter. In other implementation, functionality implemented by the logical unit identification unit 432 may be offloaded to an intermediate computer system, distinct from the host 400.

The ICH 424 connects and controls peripheral devices. In FIG. 4, the ICH 424 is connected to IDE/ATA drives 408 and to universal serial bus (USB) ports 410. The ICH 424 may also be connected to a keyboard 412, a selection device 414, firewire ports 416, CD-ROM drive 418, and a network interface 420. The ICH 424 can also be connected to a graphics controller 404. The graphics controller is connected to a display device 406 (e.g., monitor). In some embodiments, the computer system 400 can include additional devices and/or more than one of each component shown in FIG. 4 (e.g., video cards, audio cards, peripheral devices, etc.). For example, in some instances, the computer system 400 may include multiple processors, multiple cores, multiple external CPU's. In other instances, components may be integrated or subdivided.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for dynamic tracking of virtual logical storage units as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:

in response to a notification indicating that a request to access a destination logical storage unit identified by a destination logical storage unit identifier cannot be served, requesting a current list of logical storage unit identifiers and serial identification numbers associated therewith;

determining a first serial identification number associated with the destination logical storage unit identifier;

determining that a first of the serial identification numbers of the current list matches the first serial identification number associated with the destination logical storage unit identifier; and identifying the destination logical storage unit by a first of the logical storage unit identifiers of the current list that is associated with the first of the serial identification numbers.

2. The method of claim 1, further comprising:

associating the first of the logical storage unit identifiers of the current list with the first serial identification number.

3. The method of claim 2, further comprising:

discarding, from local memory, the destination logical storage unit identifier associated with the destination logical storage unit and associating the first of the logical storage unit identifiers of the current list with the destination logical storage unit.

4. The method of claim 1, further comprising:

transmitting the request to access the destination logical storage unit identified by the destination logical storage unit identifier;

receiving the notification indicating that the request to access the destination logical storage unit cannot be served; and storing an indication of at least one of the request and the notification.

5. The method of claim 1, further comprising:

generating a second request to access the destination logical storage unit based, at least in part, on the request wherein the second request identifies the destination logical storage unit by the first of the logical storage unit identifiers; and transmitting the second request.

6. The method of claim 1, wherein said determining that the first of the serial identification numbers of the current list matches the first serial identification number associated with the destination logical storage unit identifier comprises one of:

comparing the first of the serial identification numbers of the current list with the first serial identification number associated with the destination logical storage unit identifier, and comparing a representation of the first of the serial identification numbers of the current list with a representation of the first serial identification number associated with the destination logical storage unit identifier.

7. The method of claim 1, further comprising:

in response to a second notification indicating that a second request to access a second destination logical storage unit identified by a second destination logical storage unit identifier cannot be served, requesting a second current list of logical storage unit identifiers and serial identification numbers associated therewith;

determining a second serial identification number associated with the second destination logical storage unit identifier;

determining that none of the serial identification numbers of the second current list match the second serial identification number associated with the second destination logical storage unit identifier; and indicating failure of the second request to access the second destination logical storage unit.

8. The method of claim 7, wherein said determining that none of the serial identification numbers of the second current list match the second serial identification number associated with the second destination logical storage unit identifier further comprises:

successively comparing the second serial identification number associated with the second destination logical storage unit identifier with the serial identification numbers of the current list.

9. The method of claim 7, further comprising deleting an indication of the second destination logical storage unit, wherein the indication of the second destination logical storage unit comprises the second destination logical storage unit identifier that identifies the second destination logical storage unit and the second serial identification number associated with the second destination logical storage unit identifier.

10. The method of claim 1, further comprising transmitting a small computer system interface INQUIRY command for requesting the serial identification numbers associated with the current list of logical storage unit identifiers.

11. A method comprising:

transmitting a request to access a destination logical storage unit identified by a destination logical storage unit identifier;

receiving a notification indicating that the request to access the destination logical storage unit identified by the destination logical storage unit identifier cannot be served;

in response to receiving the notification, requesting a current list of logical storage unit identifiers and serial identification numbers associated therewith;

determining a first serial identification number associated with the destination logical storage unit identifier;

determining that a first of the serial identification numbers of the current list matches the first serial identification number associated with the destination logical storage unit identifier;

identifying the destination logical storage unit by a first of the logical storage unit identifiers of the current list that is associated with the first of the serial identification numbers; and generating a second request to access the destination logical storage unit based, at least in part, on the request, wherein the second request identifies the destination logical storage unit by the first of the logical storage unit identifiers; and retransmitting the second request.

12. The method of claim 11, wherein the notification indicates at least one of a failure of the request to access the destination logical storage unit and the destination logical storage unit identifier being an invalid identifier of the destination logical storage unit.

13. The method of claim 11, wherein said determining that the first of the serial identification numbers of the current list matches the first serial identification number associated with the destination logical storage unit identifier further comprises comparing the first serial identification number associated with the destination logical storage unit identifier with each of the serial identification numbers of the current list.

14. The method of claim 11, further comprising associating the first of the logical storage unit identifiers of the current list with the destination logical storage unit.

15. A computer program product for dynamically tracking virtual logical storage units, the computer program product comprising:

a computer readable storage medium having computer readable program code embodied therewith, the computer readable program code configured to:

request, in response to a notification indicating that a request to access a destination logical storage unit identified by a destination logical storage unit identifier cannot be served, a current list of logical storage unit identifiers and serial identification numbers associated therewith;

determine a first serial identification number associated with the destination logical storage unit identifier;

determine that a first of the serial identification numbers of the current list matches the first serial identification number associated with the destination logical storage unit identifier; and identify the destination logical storage unit by a first of the logical storage unit identifiers of the current list that is associated with the first of the serial identification numbers.

16. The computer program product of claim 15, wherein the computer readable program code is further configured to:

associate the first of the logical storage unit identifiers of the current list with the first serial identification number.

17. The computer program product of claim 15, wherein the computer readable program code is further configured to:

request, in response to a second notification indicating that a second request to access a second destination logical storage unit identified by a second destination logical storage unit identifier cannot be served, a second current list of logical storage unit identifiers and serial identification numbers associated therewith;

determine a second serial identification number associated with the second destination logical storage unit identifier;

determine that none of the serial identification numbers of the second current list match the second serial identification number associated with the second destination logical storage unit identifier; and indicate failure of the second request to access the second destination logical storage unit.

18. The computer program product of claim 15, wherein the computer readable program code is further configured to:

generate a second request to access the destination logical storage unit based, at least in part, on the request, wherein the second request identifies the destination logical storage unit by the first of the logical storage unit identifiers; and transmit the second request.

19. An apparatus comprising:

a processor;

a network interface coupled with the processor; and a logical unit identification unit operable to:

request, in response to a notification indicating that a request to access a destination logical storage unit identified by a destination logical storage unit identifier cannot be served, a current list of logical storage unit identifiers and serial identification numbers associated therewith;

determine a first serial identification number associated with the destination logical storage unit identifier;

determine that a first of the serial identification numbers of the current list matches the first serial identification number associated with the destination logical storage unit identifier; and identify the destination logical storage unit by a first of the logical storage unit identifiers of the current list that is associated with the first of the serial identification numbers.

20. The apparatus of claim 19, wherein the logical unit identification unit comprises machine-readable media.

* * * * *